Nov. 20, 1934.    G. A. ELLESTAD    1,981,264
OPHTHALMIC MOUNTING
Filed Sept. 17, 1932

Gerhard A. Ellestad
INVENTOR

Patented Nov. 20, 1934

1,981,264

UNITED STATES PATENT OFFICE 1,981,264

OPHTHALMIC MOUNTING

Gerhard A. Ellestad, Rochester, N. Y., assignor to Bausch & Lomb Optical Company, Rochester, N. Y., a corporation of New York Application September 17, 1932, Serial No. 633,630

5 Claims. (Cl. 88—47)

This invention relates to ophthalmic mountings and more particularly it has reference to means for attaching mountings to lenses to provide rimless spectacles and eyeglasses.

One of the objects of my invention is to provide an improved ophthalmic mounting. Another object is to provide means for locking a retaining element on an ophthalmic mounting. A further object is to provide fusible means for locking a screw on an ophthalmic mounting. These and other objects and advantages reside in certain novel features of construction, arrangement and combination of parts as will hereinafter be more fully described and pointed out in the appended claims.

Referring to the drawing.

Figure 1:
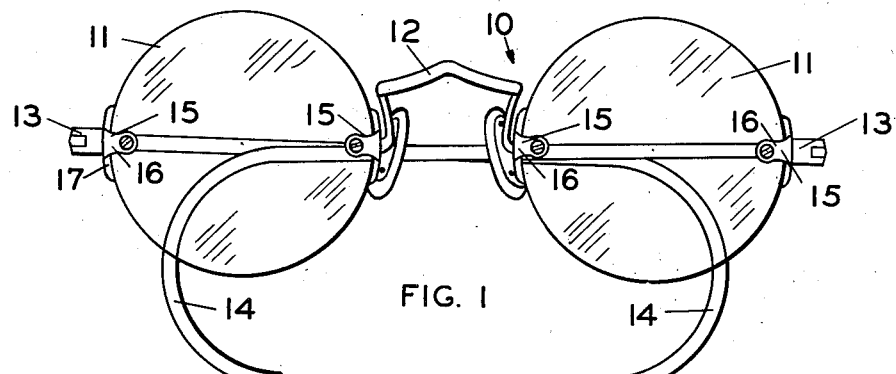
Fig. 1 is a front view of a pair of spectacles embodying my invention.
Figure 2:
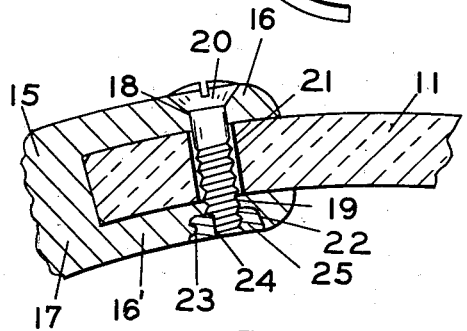
Fig. 2 is an enlarged sectional view showing the strap secured to the lens.

One embodiment of my invention is shown in the drawing wherein 10 indicates, generally, a pair of rimless spectacles comprising the two lenses 11 connected by a bridge 12 and having the end pieces 13 on which the temples 14 are pivotally mounted. The bridge and the end pieces are secured to the lenses 11 by means of mountings 15 which comprise the two spaced straps 16 and 16' positioned on opposite faces of the lens and a shoe 17 which extends along the edge of the lens. The strap 16 is provided with the aperture 18 and the strap 16' has the threaded portion 19. The screw 20 is positioned in aperture 18 and extends through the opening 21 in lens 11 and into the threaded portion 19.

A countersunk depression 22 is formed on strap 16' around the threaded portion and the walls of this depression have the integral projections or fins 23. The end of screw 20 has a flattened portion 24. In attaching the mounting 15 to the lens 11 the screw 20 is threaded into the strap 16' in the usual manner. A fusible substance 25 is then placed in the depression 22, heat is applied to render the substance plastic and pressure is then applied to force the plastic substance into the depression and around the fins 23 and the end of screw 20. Although the fusible substance 25 could be of any suitable material, I prefer to use a pyroxylin substance sold under the trade-mark "Lumarith". This pyroxylin substance can be softened by the application of a reasonable amount of heat and can be easily worked. The fusible substance is thus firmly anchored to the strap 16' and to the screw 20 so that screw 20 cannot turn and hence holds the lens 11 firmly in place.

Figure 4:
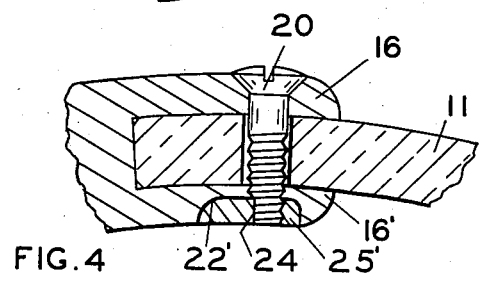
Fig. 4 is a sectional view of a modification.
Figure 5:
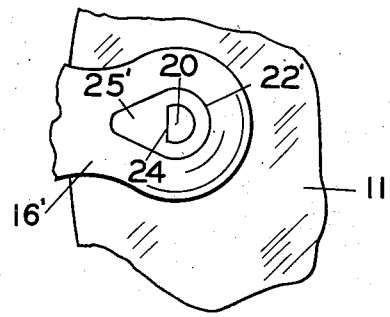
Fig. 5 is a fragmentary rear view of same.
Figure 3:
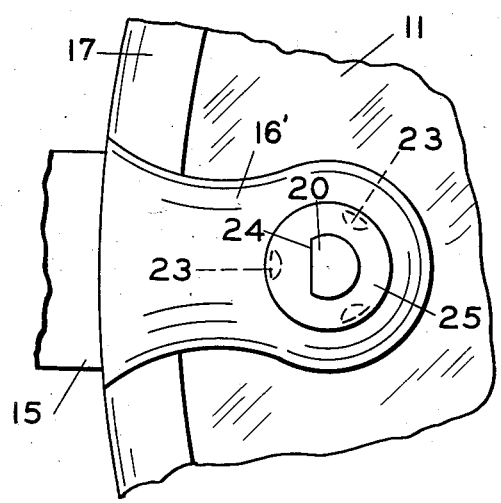
Fig. 3 is a fragmentary rear view of the strap.

A modification is shown in Figs. 4 and 5 wherein the depression 22' which is formed in strap 16' is irregular in outline so that the fusible substance 25' cannot turn. The end of screw 20 has a flattened portion 24 so the screw cannot turn with respect to the molded substance 25'. Heat and pressure are applied to the fusible substance 25' so that it is softened and forced into intimate contact with the depression 22' and the end of screw 20 to lock the screw against rotation.

From the foregoing, it will be apparent that I am able to attain the objects of my invention and provide an improved ophthalmic mounting which will be firmly and securely attached to the lens. My improved mounting can, of course, be applied to bridges, box studs or end pieces as will be apparent to those skilled in the art. Various modifications can obviously be made without departing from the spirit of my invention.

I claim:

1. In an ophthalmic mounting the combination of connecting means comprising a screw threaded into a member, said member having a depression around the end of the screw, a thermo-plastic element positioned in said depression, means for locking said screw to said element and means for locking said element to said member.

2. In an ophthalmic mounting the combination of a member having an aperture, a screw threaded into said aperture, anchoring means on said member adjacent to said aperture, said screw having a non-circular portion adjacent to said anchoring means and a non-metallic fusible element molded to said anchoring means and the non-circular portion of said screw whereby said screw is locked against rotation.

3. In an ophthalmic mounting the combination of two spaced lens straps, each of said straps having an aperture in alignment with an opening in a lens, a screw positioned in said apertures and opening and threadedly secured to one of said straps, a non-circular recess formed adjacent to the aperture in said last named strap, the end of said screw having a non-circular shape, and a non-metallic, fusible member molded into said recess and around the end of said screw.

4. An ophthalmic mounting comprising a member having two spaced straps positioned, respectively, in contact with opposite faces of a lens having an opening, each of said straps having an aperture in alignment with said opening, one of said straps having a depression formed around its aperture, a screw positioned in said apertures and opening, anchoring means formed in said depression and fusible locking means molded around said anchoring means and around the end of said screw.

5. In an ophthalmic mounting the combination of two spaced straps each having an aperture in alignment with an opening in a lens, a retaining element positioned in said apertures and opening, anchoring means adjacent to the aperture on one of said straps, anchoring means on the end of said element and a fusible member molded to the anchoring means on said strap and element whereby said element is fixedly secured.

GERHARD A. ELLESTAD.